United States Patent
Robertson et al.

(10) Patent No.: US 7,583,611 B1
(45) Date of Patent: Sep. 1, 2009

(54) SYSTEM AND METHOD TO SUPPORT COMMUNICATION BETWEEN NON-COGNITIVE RADIOS AND COGNITIVE RADIOS

(75) Inventors: Richard L. Robertson, Cedar Rapids, IA (US); Robert J. Frank, Cedar Rapids, IA (US); Wayne A. Kraus, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 550 days.

(21) Appl. No.: 11/194,793

(22) Filed: Aug. 1, 2005

(51) Int. Cl.
*H04L 12/26* (2006.01)

(52) U.S. Cl. .................. 370/252; 370/465; 370/466; 370/469; 370/471; 370/474; 370/476; 455/41.2; 455/552.1; 455/553.1; 709/221; 709/222; 709/236

(58) Field of Classification Search ............... 455/450, 455/451, 452.1–2, 41.2, 68–71, 552.1, 553.1; 375/219, 222, 225, 229, 232, 295, 299, 316, 375/347; 709/220, 237; 370/464–476, 252, 370/253
See application file for complete search history.

(56) References Cited

U.S. PATENT DOCUMENTS

| | | | | |
|---|---|---|---|---|
| 6,400,962 | B1* | 6/2002 | Yamada | 455/552.1 |
| 6,965,639 | B2* | 11/2005 | Uesugi | 375/225 |
| 7,043,252 | B2* | 5/2006 | Khitrik et al. | 455/452.2 |
| 7,277,492 | B2* | 10/2007 | Itoh | 375/259 |
| 7,336,602 | B2* | 2/2008 | Silvester | 370/216 |
| 2002/0085532 | A1 | 7/2002 | Kim | |
| 2004/0259585 | A1 | 12/2004 | Yitzchak et al. | |
| 2005/0022143 | A1* | 1/2005 | Butts et al. | 716/5 |
| 2005/0058153 | A1 | 3/2005 | Santhoff et al. | |
| 2005/0198219 | A1* | 9/2005 | Banerjee et al. | 709/220 |

OTHER PUBLICATIONS

Demestichas, et al., "Issues in the Introduction of Reconfigurability in Wireless B3G Environments," printed from website http://e2r.motlabs.com/dissemination/conferences/E2R_SDRF04_WWRF.pdf on Jul. 29, 2005.

(Continued)

Primary Examiner—Tuan A Tran
(74) Attorney, Agent, or Firm—Daniel M. Barbieri

(57) ABSTRACT

A method and a device for supporting communication between a cognitive communication device and a non-cognitive communication device is provided. The cognitive device can support multiple frequencies and/or can change transmission parameters/characteristics such as the multiple access scheme used. The method includes determining if a communication signal is received from a cognitive communication device. If the communication signal is received from a non-cognitive communication device, a transmission parameter of the communication signal is identified and used to support all communication with the non-cognitive communication device. If the communication signal is received from a non-cognitive communication device, the method may further include determining if the non-cognitive communication device supports communication using packets. If packets are not supported, a wrapping function is selected based on the identified transmission parameter and used to reform the received communication signal into packets before sending the received communication signal to an application. Alternatively, If the communication signal is received from a non-cognitive communication device, a raw streaming socket is selected to send the communication signal from the network interface layer to the application.

20 Claims, 5 Drawing Sheets

OTHER PUBLICATIONS

Marshall, "It May be Network Centric, But It's the Edge that Needs the Technology!," Defense Advanced Research Projects Agency, Federal Computer Week 2$^{nd}$ Wireless Conference and Exhibition, Mar. 2, 2005, p. 1-32.

Dimitrakopoulos, et al., "Cognitive Radio, Spectrum and Radio Managemenet," Wireless World Research Forum, 2004.

* cited by examiner

SYSTEM AND METHOD TO SUPPORT COMMUNICATION BETWEEN NON-COGNITIVE RADIOS AND COGNITIVE RADIOS

CROSS REFERENCE TO RELATED APPLICATIONS

This application relates to U.S. patent application Ser. No. 11/194,779, entitled "CONTROL OF RECONFIGURABLE SIS/MAC PROTOCOLS USED IN WIRELESS COMMUNICATION DEVICES", and having inventors Richard L. Robertson and Robert J. Frank. This application additionally relates to U.S. patent application Ser. No. 11/194,782, entitled "DEVICE AND METHOD SUPPORTING COGNITIVE, DYNAMIC MEDIA ACCESS CONTROL", and having inventors Richard L. Robertson and Robert J. Frank. This application further relates to U.S. patent application Ser. No. 11/194,868, entitled "DEVICE AND METHOD SUPPORTING COGNITIVE MEDIA ACCESS CONTROL", and having inventors Richard L. Robertson and Robert J. Frank.

FIELD OF THE INVENTION

The subject of the disclosure relates generally to radio systems. More specifically, the disclosure relates to a system and a method that support communication between legacy radios and cognitive radios, more specifically with cognitive radios operating with a cognitive media access control (MAC).

BACKGROUND

Layering is used to organize programming modules into separate functional components that interact in a sequential and hierarchical way so that each layer has an interface only to the layer above and below it, and thus, no need to understand the processing performed at any of the other layers. Communication programs may be structured in layers such that programming and hardware at both ends of the communication exchange use an identical set of layers. To process a message, data in a first device flows down through each layer and is transmitted through a physical media to a second device. Before reaching the second device, the message may "hop" multiple times between intermediary devices such as routers. The message is received at the second device, and the data flows up through the layers where it is ultimately presented to the user or used in an application at the second device.

The Internet Protocol (IP) is the method or protocol by which data is sent from one device to another through a network that may include both wired and wireless connections. Each device on the network has at least one IP address that uniquely identifies it from all of the other devices on the network. Originally, the devices were computers that connected to each other using IP through the Internet. Today, the devices that employ IP have expanded to include all types of communication devices including cellular phones, personal digital assistants, radios, etc. Using IP, a message is divided into small chunks called packets that each contain both the sender's IP address and the receiver's IP address. IP is a connectionless protocol. Thus, there is no continuing connection between the sending and the receiving devices. Each packet is treated as an independent unit of data without any relation to any other unit of data. Because a message is divided into a number of independent packets, each packet can, if necessary, be sent by a different route between the sending device and the receiving device. As a result, packets can arrive in a different order than the order in which they were sent. The user datagram protocol (UDP) passes these packets on to the application in the order in which they are received, hence making an unreliable connection. However, the transmission control protocol (TCP) collects the packets and places the packets in the correct order, in conjunction with acknowledgements and retires, hence a reliable connection.

The hardware layer, also referred to as the physical layer, provides the physical components that enable the transmission and reception of bits of information whether analog or digital. Thus, in wireless communications, the physical layer receives/transmits a signal-in-space (SIS) and, for example, converts bits into pulses or into a modulated carrier waveform. The physical layer may include computer software, hardware, or both software and hardware. Generally, access to the physical layer is controlled by a MAC layer. In general, the MAC layer makes sure that devices sharing a common communications channel do not interfere with each other. The MAC layer may be in the form of computer software, hardware, or both software and hardware.

Cognitive MAC (CoMAC) radios allow the device to transmit a new waveform. For example, a cognitive radio can use different portions of the frequency spectrum as environmental conditions change or the device location changes. Cognitive, dynamic MAC (CoDMAC) radios allow fast on-the-fly MAC switching, for example, to allow switching between the multiplexing method used for communication. As a result, CoMAC and CoDMAC enabled radio networks can establish a communication link by selecting a SIS/MAC pair based on physical conditions at the device. Additionally, CoMAC and CoDMAC radios may employ TCP/IP for the transmission of the information. Legacy radios may not support TCP/IP. As a result, Legacy radios not supporting TCP/IP can not process the received packets to reform the transmitted information and can not create the packets for transmission. Legacy radios, in general, do not support SIS/MAC pair switching, and thus, can only transmit/receive using a single SIS/MAC pair. What is needed, therefore, is a system and a method that provide efficient communication between communication devices that support IP and communication devices that do not support IP. What is further needed is a system and a method that provide efficient communication between communication devices that support SIS/MAC pair switching and communication devices that do not support SIS/MAC pair switching.

SUMMARY

A particular example of the invention provides a method for supporting communication between a cognitive communication device and a non-cognitive communication device. Cognitive communication devices provide greater bandwidth efficiency across the network with a minimal increase in network overhead by changing frequency, adjusting output power, and/or altering transmission parameters and characteristics. Legacy or non-cognitive communication devices, however, have only limited ability to change frequency and/or adjust transmission parameters such as the transmission technology used. As a result, the cognitive communication device recognizes that a received communication signal is from a non-cognitive communication device based on the waveform and transmission parameters and modifies the cognition processing to support the communication.

An exemplary embodiment of the invention relates to a method of supporting communication between a cognitive communication device and a non-cognitive communication device. The method includes, but is not limited to, receiving a communication signal from a first communication device at a cognitive communication device; identifying a transmission parameter of the received communication signal at the cognitive communication device; determining if the first communication device is a cognitive communication device; selecting the identified transmission parameter for communicating with the first communication device if the first communication device is determined to be non-cognitive; selecting a transmission method to send the communication signal from a network interface layer to an application at the cognitive communication device; and sending the communication signal to the application using the selected transmission method. The transmission parameter is associated with processing of the communication signal by at least one of a physical layer and the network interface layer implemented at the cognitive communication device. The communication signal includes information used at the application.

In sending the communication signal to the application, the communication signal may be divided into a packet and wrapped to pass up a communication stack to the application. The wrapping function adds a Transport Header and an IP Header to create the packet to send up the stack. In another exemplary embodiment, the selected transmission method selects a raw streaming socket for sending the communication signal from the network interface layer to the application if the first communication device is determined to be non-cognitive.

Another exemplary embodiment of the invention includes computer-readable instructions that, upon execution by a processor, cause the processor to implement the operations of the method. Yet another exemplary embodiment of the invention includes a communication device having a computer readable media that implements the operations of the method.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals will denote like elements.

DETAILED DESCRIPTION

The goal of devices implementing CoMAC and/or CoD-MAC is to provide greater bandwidth efficiency across the network with a minimal increase in network overhead. To support this capability, the device hardware should be capable of monitoring an extremely broad radio frequency (RF) spectrum and of transmitting and receiving within that RF spectrum. Thus, cognitive devices support multiple frequencies and/or can change transmission parameters/characteristics, for example, through use of multiple SIS/MAC pairs to transmit/receive information.

In support of the cognitive device hardware, the software should support reconfigurable SIS/MAC protocols under control of a SIS/MAC application capable of selecting a single or multiple SIS/MAC pairs that provide increased bandwidth through optimum usage of a single or multiple frequencies. Cognition provides control of the SIS/MAC application so that the SIS/MAC selection process occurs in real-time or near-real-time enabling effective and timely response to the changing RF spectrum as the device moves and/or environmental conditions change. Legacy devices do not support SIS/MAC switching or, if they do, it is only in a limited form. Additionally, legacy devices may not utilize a communication stack that includes IP packets. The present invention provides a system and a method to support communication between CoMAC/CoDMAC devices while maintaining support for legacy or non-cognitive devices.

Figure 1:
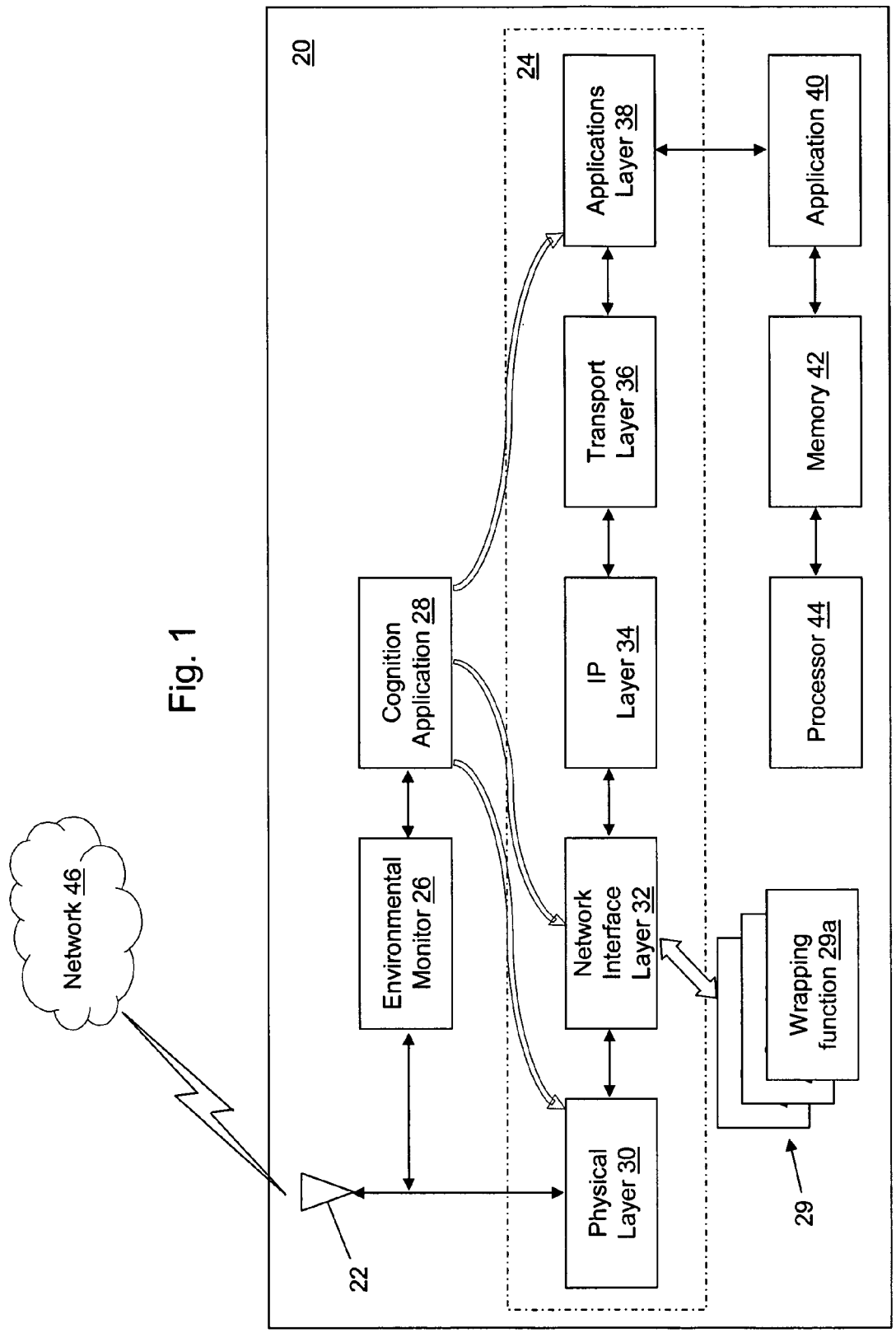
FIG. 1 is a block diagram of a cognitive communication device in accordance with an exemplary embodiment.

With reference to FIG. 1, a cognitive communication device 20 is shown. Communication device 20 has a CoMAC or CoDMAC capability to quickly and dynamically change the SIS and/or MAC protocol used to transmit/receive a wireless communication signal to/from a user. Communication device 20 may include a transceiver antenna 22, a communication stack 24, an environmental monitor 26, and a cognition application 28. Communication device 20 may provide communication capabilities across the entire communication spectrum or across only a portion of the spectrum utilizing a variety of transmission technologies and modulation schemes.

In operation, a communication signal is received by transceiver antenna 22, sent up communication stack 24 to extract data/voice information from the communication signal, and the information is received at an application 40 generally through a socket. Similarly, communication stack 24 receives information from the application 40, the information is sent down communication stack 24 forming the communication signal that is transmitted from transceiver antenna 22. In an alternative embodiment, communication device 20 may include separate transmit and receive antennas. Different and additional components may be utilized by communication device 20. For example, communication device 20 includes one or more power source that may be a battery.

Additionally, communication device 20 may include a memory 42 and a processor 44. Memory 42 stores application 40, and the cognition application 28, in addition to other information. Device 20 may have one or more memory 42 that uses the same or a different memory technology. Memory technologies include, but are not limited to, random access memory, read only memory, flash memory, etc.

Processor 44 executes instructions that may be written using one or more programming language, scripting language, assembly language, etc. The instructions may be carried out by a special purpose computer, logic circuits, or hardware circuits. Thus, processor 44 may be implemented in hardware, firmware, software, or any combination of these methods. The term "execution" is the process of running an application or the carrying out of the operation called for by an instruction. Processor 44 executes application 40, cognition application 28, the plurality of wrapping functions, and/or other instructions. Device 20 may have one or more processor 44 that use the same or a different processing technology. Additionally, processor 44 and memory 42 may be separate components of device 20 or may be embedded within another component of device 20. Cognition application 28 is an organized set of instructions that, when executed, cause device 20 to perform cognition functions. The plurality of wrapping functions also are organized sets of instructions. Cognition application 28 and the wrapping functions may be written using one or more programming language, assembly language, scripting language, etc.

Communication device 20 communicates with other devices using a network 46. Devices in a network are connected by communication paths that may be wired or wireless. The network 46 may include both wired and wireless devices, such as satellites, cellular antennas, radios, etc. The network 46 additionally may interconnect with other networks and contain sub-networks. A network can be characterized by the type of transmission technology used. Transmission technologies include code division multiple access (CDMA), frequency division multiple access (FDMA), time division multiple access (TDMA), global system for mobile communications (GSM), carrier sense multiple access (CSMA), orthogonal frequency division multiplexing (OFDM), Bluetooth, IEEE 802.11, and others as known to those skilled in the art. Each transmission technology has associated with it a number of transmission parameters also as known to those skilled in the art.

Conventional RF technology employs continuous sine waves that are transmitted with data embedded in the modulation of the sine waves' amplitude or frequency. In general, transceiver antenna 22 receives an analog signal. An analog RF/IF filter filters the received analog signal from a transmission RF to an intermediate frequency (IF). An analog-to-digital converter converts the IF signal from an analog signal to a digital signal. A modem demodulates and otherwise processes the digital signal to extract the information that is sent to an application for use. Similarly, in a reverse procedure, digital data received from the application is modulated by the modem, converted from a digital signal to an analog signal, filtered from IF to RF, and transmitted by transceiver antenna 22. In an alternative embodiment, the signal transmitted/received is digital and no conversion is required.

Communication device 20 of the present invention transmits and receives data and/or voice information using communication stack 24 and cognition application 28 to determine an optimum SIS/MAC pair for transmission/reception of a communication signal from another device. Each device uses hardware and/or software that provide CoMAC/CoDMAC capability. Cognition application 28 supports the selection of a single or of multiple SIS/MAC pairs based on current conditions at the communication devices in real-time or near-real-time. In general, legacy devices do not allow selection of the SIS/MAC pair. Additionally, legacy devices may not support communication stack 24. As a result, cognition application 28 also determines when a SIS/MAC pair can not be changed.

Communication stack 24 may include a physical layer 30, a network interface layer 32, an IP layer 34, a transport layer 36, and an applications layer 38. Various control messages are passed between the layers of communication stack 24 to transmit data from the application 40 to an application at another communication device. The data from application 40 is "handed down" to the lower layers in communication stack 24 for actual transmission to an application at another communication device. Received data is "handed up" communication stack 24 to the appropriate application at the other communication device.

Physical layer 30 sends information in the form of bits through the transceiver antenna 22, and the modem that modulates and demodulates the signal may exist at the physical layer or the network interface layer. Network interface layer 32 includes MAC protocols that handle issues such as channel selection, channel access, and IP packet processing. Additionally, network interface layer 32 includes a plurality of wrapping functions 29. IP layer 34 handles communication from one device to another device providing, for example, routing information. Transport layer 36 manages the end-to-end control of the data packets. Applications layer 38 identifies other communication nodes, identifies a quality of service, considers user authentication and privacy, and identifies any constraints on data syntax. The functions of applications layer 38 may be implemented at application 40 as known to those skilled in the art.

Figure 2:
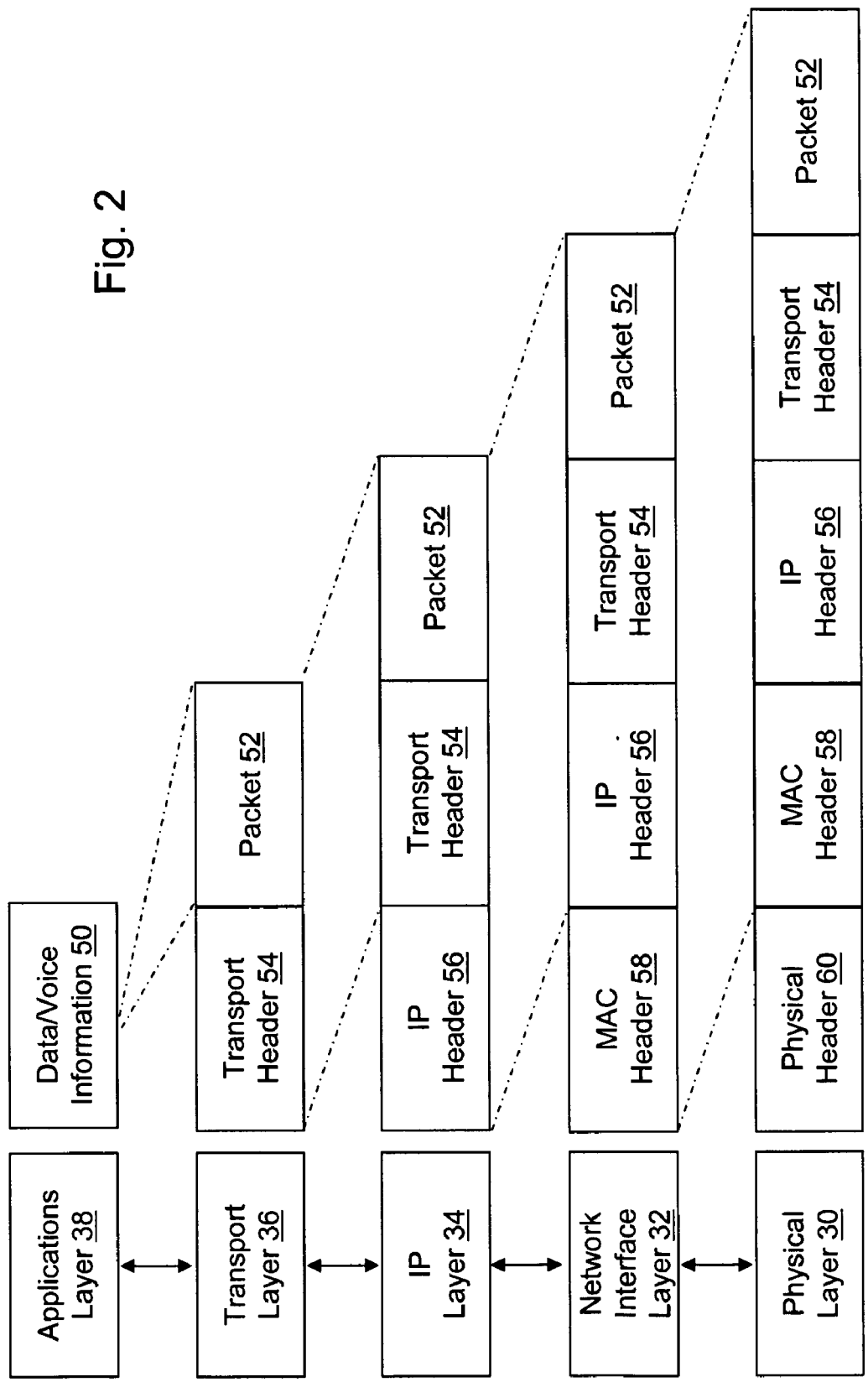
FIG. 2 is a block diagram of a communication stack utilizing packets in accordance with an exemplary embodiment.

With reference to FIG. 2, applications layer 38 communicates with application 40 receiving data/voice information 50. In general, transport layer 36 uses either TCP or UDP protocols in combination with IP to divide the data/voice information 50 into one or more packet 52 for efficient routing through the network 46. On reception, transport layer 36 reassembles the packets into the original data/voice information 50 sent to the applications layer 38 (or directly to the application 40). Transport layer 36 prefixes a transport header 54 onto each packet 52 of the data/voice information 50 received from the applications layer 38. Transport header 54 includes the source and destination ports, and if TCP is the transport protocol, the sequence number of the packet.

IP layer 34 includes the source and destination IP addresses for each packet 52 in an IP header 56 so that it is received at the correct communication node. IP output packets or "datagrams" are prefixed with IP header 56. IP hands over each datagram to the network interface layer 32. The IP protocol is used to route the packets from network to network. Each intervening device on the network 46 checks the destination IP address to see where next to forward the packet. Thus, communication device 20 supports multiple hops between communication nodes. Routers contain routing tables that move the datagrams to the next "hop," which is either the destination device or another router.

Network interface layer 32 handles the routing and forwarding of the packet and encodes/decodes the datagram into bits forming a frame that includes a MAC header 58. Network interface layer 32 furnishes transmission protocol knowledge and management, handles errors in the physical layer (PHY), flow control, and frame synchronization. Network interface layer 32 generally is divided into two sub-layers: the MAC layer and the logical link control (LLC) layer. The MAC sub-layer controls how a device on the network 46 gains access to the data/voice information 50, acquires the data path, and controls the movement of bits over the data path. The LLC sub-layer controls frame synchronization, flow control, and error checking. Network interface layer 32 prefixes the datagram with the MAC header 58. MAC header 58 is composed of a MAC address, frame control, sequence control, duration information, and other fields. The MAC sub-layer protocols support methods of sharing the transmission medium among a number of devices and include TDMA, CDMA, FDMA, etc. as known to those skilled in the art both now and in the future. The MAC sub-layer interfaces directly with the network medium. Consequently, each different type of network medium requires a different MAC layer. Physical layer 30 conveys the bit stream through the network 46 at the electrical and mechanical level. Thus, physical layer 30 provides the hardware means of sending and receiving data on a carrier.

Environmental monitor 26 provides a characterization of the local spectral environment at communication device 20. Spectral characterization data is input to cognition application 28. The physical location of the device 20 may also be determined to identify local spectrum usage constraints that may restrict the available SIS/MAC pairs assigned for each communication. Cognition application 28 provides a stable interface for IP layer 34 and for transport layer 36 while supporting dynamic reconfiguration of the MAC layer. Cognition application 28 receives spectral environment inputs to optimize communication between communication devices in the network 46. Cognition application 28 selects the optimum SIS and MAC pairing, and passes the SIS selection into physical layer 30 and the MAC selection into network interface layer 32 while the user 40 communicates using standard IP network communication protocols over the network. Cognition application 28 selects the wrapping function associated with the transmission/reception of a communication signal to/from a legacy device that does not support SIS/MAC pair switching and/or IP packets, or selects a raw stream socket to provide communication to the application.

Figure 3:
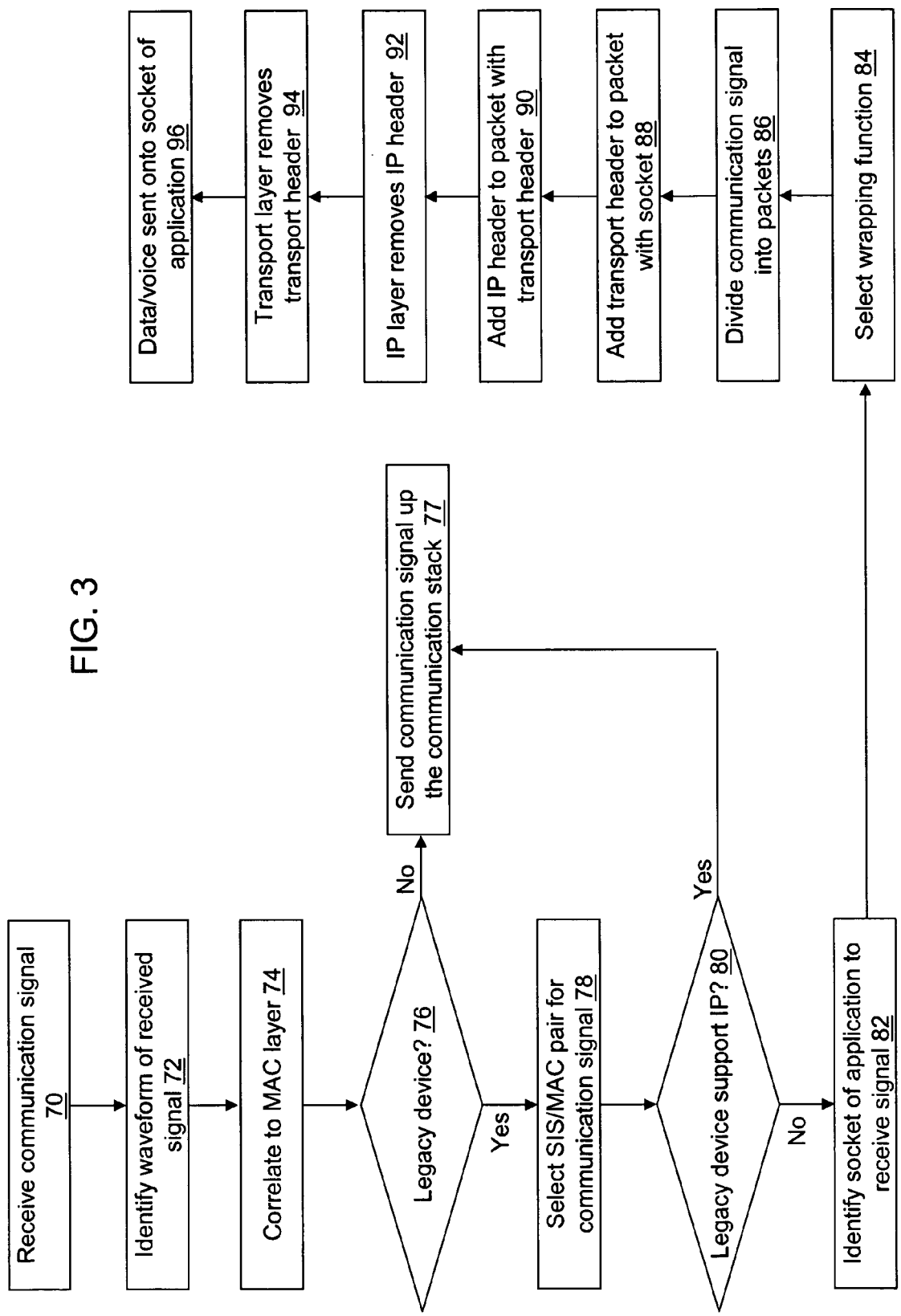
FIG. 3 is a flow diagram illustrating exemplary operations performed at the cognitive communication device to receive a communication from a non-cognitive communication device in accordance with a first exemplary embodiment.

With reference to FIG. 3, exemplary operations of cognitive communication device 20 are described. The exemplary operations apply to any communication device within network 46. In an operation 70, communication device 20 receives a communication signal at the physical layer 30. In an operation 72, the waveform of the received communication signal is identified. For example, the frequency and bandwidth of the communication signal is determined. The transceiver 22 is designed to listen for signals at multiple frequencies. In an operation 74, the received waveform is correlated to a MAC layer to determine the MAC layer used for transmission of the signal. For example, the MAC layer may support transmission technologies that include TDMA, CDMA, FDMA, GSM, Aloha, slotted Aloha, OFDM, etc. Based on the identified waveform and MAC layer, in an operation 76, a determination is made concerning whether or not the source of the signal is a legacy device. Either acknowledged or unacknowledged methods may be used to determine if the signal source is a legacy device or not. Methods of acknowledgement between cognitive devices are predetermined at equivalent layers within communication stack 24. For example, the lowest layer interaction is between their respective SIS and physical layers 30 possibly using a bi-directional data exchange. The highest layer interaction is between their respective cognition applications 28, for example, using an established handshake protocol. Unacknowledged methods include a watermark or embedding information in the SIS. If the source of the signal is not a legacy device, the signal is passed up communication stack 24 in an operation 77. Cognition application 28 optimizes the SIS/MAC pairing as part of the process of passing the signal up the communication stack as environmental conditions change at a given location or the devices communicating within network 46 move and encounter different environmental conditions.

If the source of the signal is a legacy device, in an operation 78, a SIS/MAC pair is selected for communicating with the legacy device based on the identified waveform and MAC layer. In an operation 80, a determination is made concerning whether or not the source of the signal is a legacy device that supports IP. If the source of the signal supports IP, the signal is passed up the communication stack 24 in an operation 77 by the cognition application 28 upward switching to packet forwarding at the MAC layer. If the source of the signal does not support IP, in an operation 82, a socket to application 40, receiving the communication signal, is identified.

A wrapping function is selected in an operation 84. The wrapping function is selected by the cognition application based on the selected SIS/MAC pair of the communication signal, excluding usage of a SIS/MAC pair between cognitive radios. Thus, a wrapping function is defined for each SIS/MAC pair available for legacy devices. Alternatively, a general wrapping function may be defined for all SIS/MAC pairs. The wrapping function reforms the received communication signal for transmission through IP layer 34 and transport layer 36. In an operation 86, the wrapping function, for example wrapping function 29a, divides or chops the communication signal into a maximum packet size data unit. In an operation 88, the wrapping function adds the transport header 54 to each packet. Transport header 54 includes the determined port number. In an exemplary embodiment, transport header 54 is a UDP transport header. In an operation 90, the wrapping function adds IP header 56 to each packet that includes transport header 54. The packetized signal is sent up the communication stack to IP layer 34 that removes IP header 56, in an operation 92, and to transport layer 36 that removes transport header 54, in an operation 94, and reforms the voice/data information 50 for transmission to the application 40. The plurality of wrapping functions 29 may be resident within network interface layer 32, more specifically the MAC layer, to prevent delay in passing up the packets. In an alternative embodiment, the plurality of wrapping functions 29 may be resident with the cognition application 28 or within the applications layer 38, though throughput and latency may suffer. In an operation 96, the data/voice information contained in the received communication signal is sent to the socket bound to the application which receives the signal.

Figure 4:
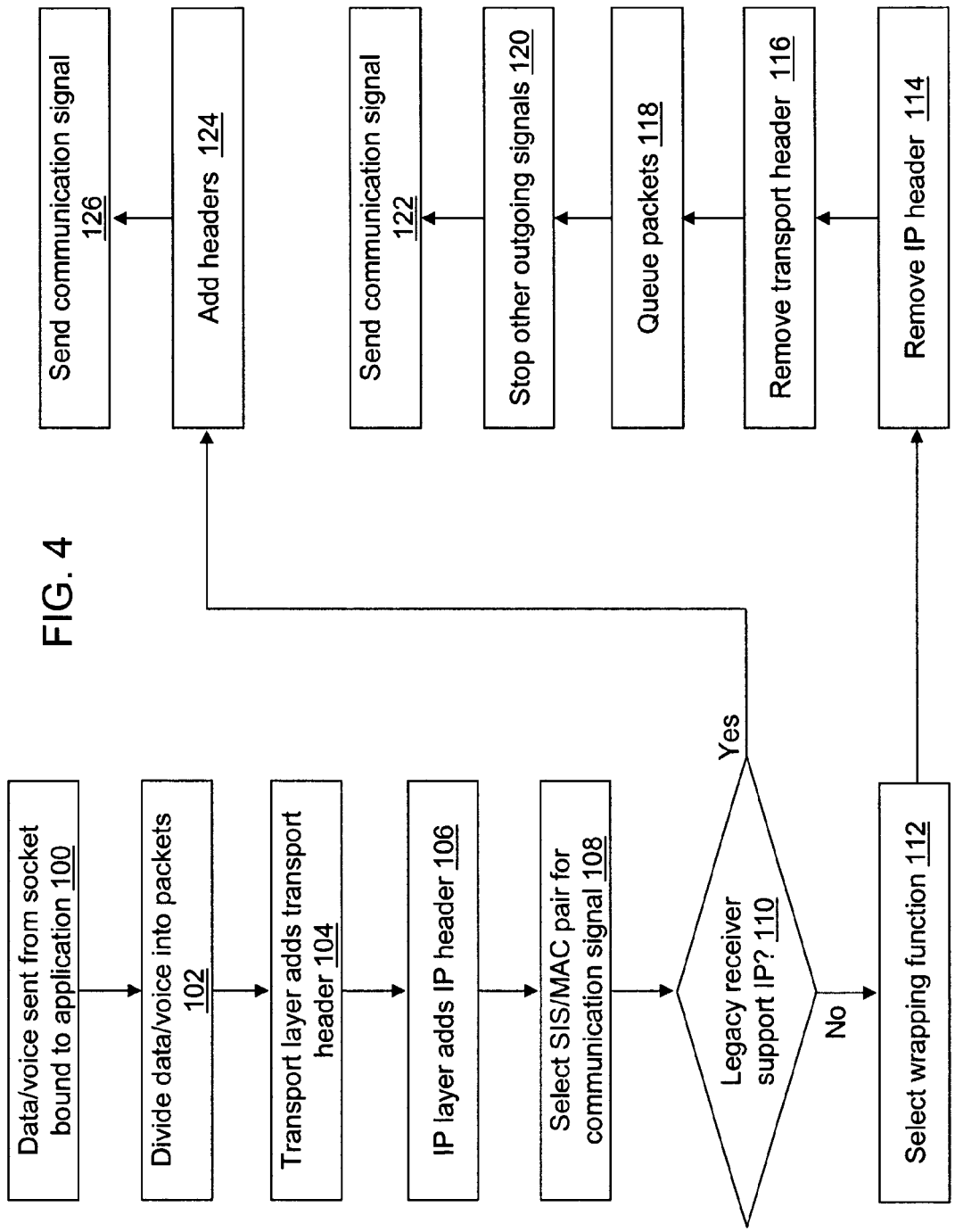
FIG. 4 is a flow diagram illustrating exemplary operations performed at the cognitive communication device to send a communication to the non-cognitive communication device in accordance with a first exemplary embodiment.

With reference to FIG. 4, the reverse process of sending data/voice information 50 to a legacy device is shown. In an operation 100, data/voice information 50 is sent from a socket bound to application 40 at applications layer 38. A socket is one endpoint of a two-way communication link between two programs running on the network. A socket is bound to a port number so that transport layer 36 can identify the application to which data is destined to be sent. As known to those skilled in the art, application 40 may include functionality performed at applications layer 38 and directly control transmission of the data/voice information 50 over a link to transport layer 36. In an operation 102, the sent data/voice information 50 is divided into packets using TCP at transport layer 36, while the application divides the data sent to UDP at transport layer 36. In an operation 104, transport layer 36 adds transport header 54 to each packet 52. In an operation 106, IP layer 34 receives each packet 52 including transport header 54 and adds IP header 56 to each packet forming a datagram. In an operation 108, the SIS/MAC pair for transmission of the data/voice information 50 is selected.

In an operation 110, a determination is made concerning whether or not the device for receiving data/voice information 50 is a legacy device that supports IP. If the receiver of the data/voice information 50 supports IP, in an operation 124, MAC header 58 is added to each datagram received from IP layer 34 forming a frame, and physical header 60 is added to each frame at physical layer 30 forming a communication signal. The communication signal is sent at physical layer 30 to the legacy device in an operation 126.

If the receiver of the signal does not support IP, a wrapping function is selected in an operation 112 based on the selected SIS/MAC pair. The selected wrapping function removes the IP header 56 from the datagram in an operation 114. The selected wrapping function removes transport header 54 from the packet in an operation 116. In an operation 118, the packets are stored in a queue in the correct receive order. After processing each of the packets into the queue, outgoing communication signals from communication device 20 are stopped in an operation 120. In an operation 122, the queued communication signal is sent to the receiving communication device. Stopping any other communications prevents interruption of the communication signal. Network interface layer 32 should have sufficient queuing capacity and speed to combine the packets into a continuous stream.

Figure 5:
FIG. 5 is a flow diagram illustrating exemplary operations performed at the cognitive communication device to receive a communication from a non-cognitive communication device in accordance with a second exemplary embodiment.

With reference to FIG. 5, an alternative method for providing communications between a CoMAC/CoDMAC device and legacy devices is shown. In an operation 130, a raw streaming socket is opened between the MAC layer and application 40. A socket is a means by which the application communicates. A socket is created having a certain type, for example, stream, datagram, or raw, that is specified when the socket is created. A "raw streaming socket" is a custom socket type used to communicate other than through the transport layer 36 and the IP layer 34. The same interface is created to the client application so that the interface is transparent to the application. A "raw streaming socket" allows the application to interact with a protocol independent stream interface identical to that of TCP while blocking and formatting the data according to whatever transport medium is specified for the socket.

Data/voice information 50 is extracted from the communication signal received at the physical layer and is queued, in an operation 132, to ensure a continuous flow of traffic to the socket bound to application 40. In an operation 134, the queued data/voice information 50 is sent to the socket to application 40. The process is reversed for transmitting data/voice information 50 to the other communication device.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments (which can be practiced separately or in combination) were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of supporting communication between a cognitive communication device and a non-cognitive communication device, the method comprising:
   receiving a communication signal from a first communication device at a cognitive communication device;
   identifying a transmission parameter of the received communication signal at the cognitive communication device, wherein the transmission parameter is associated with processing of the communication signal by at least one of a physical layer and a network interface layer implemented at the cognitive communication device;
   determining if the first communication device is a cognitive communication device;
   selecting the identified transmission parameter for communicating with the first communication device if the first communication device is determined to be non-cognitive;
   selecting a transmission method to send the communication signal from the network interface layer to an application at the cognitive communication device, wherein the communication signal includes information used at the application; and
   sending the communication signal to the application using the selected transmission method.

2. The method of claim 1, further comprising:
   determining if the first communication device supports communication using packets if the first communication device is determined to be non-cognitive; and
   selecting a wrapping function based on the identified transmission parameter if the first communication device is determined not to support communication using packets, the selected wrapping function reforming the received communication signal before sending the communication signal to the application using the selected transmission method.

3. The method of claim 2, wherein the selected transmission method uses a communication stack, the communication stack comprising a plurality of layers, each layer of the plurality of layers supporting a different communication protocol and interfacing with an adjacent layer.

4. The method of claim 3, wherein the wrapping function divides the received communication signal into packets before sending the communication signal to the application.

5. The method of claim 4, wherein the wrapping function adds a transport header to each of the packets before sending the communication signal to the application.

6. The method of claim 5, wherein the wrapping function adds an Internet protocol header to each of the packets before sending the communication signal to the application.

7. The method of claim 3, further comprising:
   receiving new information from the application, the new information to be sent to the first communication device;
   forming a second communication signal, the second communication signal being formed using the communication stack that divides the received new information into packets, and further the new information being included as part of the second communication signal;
   forming the second communication signal using the identified transmission parameter if the first communication device is determined to be non-cognitive; and
   sending the second communication signal to the first communication device.

8. The method of claim 7, further comprising:
   reforming the second communication signal into a continuous signal using the selected wrapping function before sending the second communication signal to the first communication device if the first communication device is determined not to support communication using packets.

9. The method of claim 8, further comprising:
   queuing the reformed second communication signal before sending the reformed second communication signal.

10. The method of claim 9, further comprising:
    stopping a third communication signal before sending the reformed second communication signal.

11. The method of claim 1, wherein identifying the transmission parameter includes correlating the received communication signal to a transmission technology.

12. The method of claim 1, wherein the network interface layer includes a media access control layer, and further wherein the identified transmission parameter is associated with a transmission technology supported at the media access control layer.

13. The method of claim 12, wherein the transmission technology is selected from the group consisting of code division multiple access, frequency division multiple access, time division multiple access, global system for mobile communications, carrier sense multiple access, Bluetooth, IEEE 802.11, Aloha, slotted Aloha, and orthogonal frequency division multiplexing.

14. The method of claim 1, wherein determining if the first communication device is a cognitive communication device uses a handshake protocol.

15. The method of claim 1, wherein determining if the first communication device is a cognitive communication device uses a watermark.

16. The method of claim 1, wherein determining if the first communication device is a cognitive communication device uses information embedded in the communication signal.

17. The method of claim 1, wherein determining if the first communication device is a cognitive communication device uses a bi-directional data exchange.

18. The method of claim 1, wherein the selected transmission method selects a raw streaming socket for sending the communication signal from the network interface layer to the application if the first communication device is determined to be non-cognitive.

19. A computer-readable medium having computer-readable instructions stored thereon that, upon execution by a processor, cause the processor to support communication between a cognitive communication device and a non-cognitive communication device, the instructions comprising:
   identifying a transmission parameter of a communication signal received from a first communication device, wherein the transmission parameter is associated with processing of the communication signal by at least one of a physical layer and a network interface layer;
   determining if the first communication device is a cognitive communication device;
   selecting the identified transmission parameter for communicating with the first communication device if the first communication device is determined to be non-cognitive;
   selecting a transmission method to send the communication signal from the network interface layer to an application, wherein the communication signal includes information used at the application; and
   causing the communication signal to be sent to the application using the selected transmission method.

20. A communication device, the communication device comprising:
   a receiver, the receiver receiving a communication signal from a first communication device;
   an application, the application receiving at least a portion of the received communication signal;
   a computer-readable medium having computer-readable instructions stored thereon, the instructions comprising identifying a transmission parameter of the received communication signal, wherein the transmission parameter is associated with processing of the communication signal by at least one of a physical layer and a network interface layer implemented at the device;
   determining if the first communication device is a cognitive communication device;
   selecting the identified transmission parameter for communicating with the first communication device if the first communication device is determined to be non-cognitive;
   selecting a transmission method to send the communication signal from the network interface layer to the application; and
   causing the communication signal to be sent to the application using the selected transmission method; and
   a processor for executing the computer-readable instructions, the processor executing the instructions to support communication with the first communication device.

* * * * *